United States Patent

Kasamatsu

[11] 3,944,191
[45] Mar. 16, 1976

[54] PLASTICS-PROCESSING MACHINE WITH COMBINED PERFORMANCE OF EXTRUSION AND INJECTION

[76] Inventor: Tadashi Kasamatsu, 6-10, 2-chome, Shiratori, Katsushika, Tokyo, Japan

[22] Filed: Nov. 29, 1973

[21] Appl. No.: 420,155

[30] Foreign Application Priority Data
Dec. 11, 1972  Japan............................ 47-124689

[52] U.S. Cl. ............................................. 259/191
[51] Int. Cl.² ............................................. B29B 1/06
[58] Field of Search ......... 259/191, 192, 193, 9, 10; 425/208

[56] References Cited
UNITED STATES PATENTS

| | | | |
|---|---|---|---|
| 1,935,050 | 11/1933 | Gordon | 259/191 |
| 2,595,455 | 5/1952 | Heston | 259/191 |
| 2,680,879 | 6/1954 | Schnuck | 259/191 |
| 3,123,860 | 3/1964 | Vesilind | 259/191 |
| 3,169,275 | 2/1965 | Compton | 425/245 X |
| 3,850,415 | 11/1974 | Hansen | 259/191 |

*Primary Examiner*—Stanley N. Gilreath
*Assistant Examiner*—Alan Cantor
*Attorney, Agent, or Firm*—Kemon, Palmer & Estabrook

[57] ABSTRACT

A plastics extrusion-injection molding machine comprising a screw cylinder formed with supply, compression and melting portions having boosting means formed in the supply portion to allow plastic material passing therein to fully occupy the supply section and boost the discharge pressure of the plastic material to a predetermined level high enough to permit injection molding. The machine also includes back-flow means formed in the screw member at the melting portion to allow plastic material to escape backwardly and prevent abnormally high pressure from building up in the machine.

5 Claims, 8 Drawing Figures

PLASTICS-PROCESSING MACHINE WITH COMBINED PERFORMANCE OF EXTRUSION AND INJECTION

BACKGROUND OF THE INVENTION

1. Field of the Invention

The present invention relates to an extruder for plastics-processing, and, more particularly, to a plastics-processing apparatus which has a combined performance of extrusion and injection.

2. Description of Prior Art

As is well known in the art, the extruders for plastics-processing are machines for manufacturing plastics products with uniform cross-section, such as film, sheet, pipes, angulars or rods, in continuous lengths. The injection molding machines are, on the other hand, plastics-processing machines for producing three-dimentional mouldings one by one by intermittently injecting molten polymer into molds.

Comparison between the machines of these two types can be tabulated as to their performance, as follows:

Performance Comparison between Extruders and Injection Molding Machines

| | Extruders | Injectors |
|---|---|---|
| Productivity | Great | Small |
| Products | lengths having the same cross-section | Three-dimentional Moldings |
| Material discharge method | Screw rotation | Plunger stroke |
| Plasticizing capacity | Great | Small |
| Plasticizing property | Low temperature Uniform | High temperature Non-uniform |
| Mixing property | Excellent | Poor |
| Dispersing property | Excellent | Poor |
| Processing temperature | Low | High |
| Product cooling | Rapid | Slow |
| Stay period | Short | Long |
| Melt stagnation | None | Occurs |
| Maintenance & control | Easy | Difficult |
| Cost | High | Low |

The above differences in performance are considered to come from the basic difference in processing operation.

More specifically, since the extruders are equipped with a long screw, the polymer can be heated gradually with a gentle temperature gradient during the period from the time when it is fed to the hopper to the time when it is discharged from the outlet of the nozzle. As a result, there is little cross-sectional temperature difference, that is, the temperature difference between the material, which is sticks to the inner surface of the cylinder, and the material which is sticks to the outer surface of the screw. As compared with this long screw extrusion, however, the injection molding machines with a short screw (or plunger) have such a construction as to inevitably heat the polymer rapidly within a short period of time, so that great difference in the cross-sectional temperature will result. This may lead to insufficient plasticizing and mixing of the polymer.

Since, moreover, the long screw extrusion can process the material at a considerably lower temperature than the short screw injection, the cooling time period required can be shortened accordingly, and the possible thermal deterioration of the material can be effectively prevented.

Since the long screw extrusion can enjoy great efficiency in mixing, it should also be appreciated as another advantage that products of minute cell-structure with improved foaming ratios can be obtained if applied to foam molding, and that uniformly colored products can be obtained by using dry-color.

Theoretically, it is of course possible to install long screws in the conventional injection molding machines. In this instance, however, a complicated hydraulic mechanism of large scale is required, which makes this impracticable.

For these reasons, extruders can be said to have greater productivity and higher performance at lower cost than injection molding machines.

When it is intended to afford the injection molding function to conventional extruders, several impediments are encountered. In order to apply the extruders to intermittent injection, a considerable duration of time is required until a proper level of injection pressure is obtained after the screw is started. In addition, the screw, which is rotating with a large torque, cannot practically be stopped due to its inertia, even if the driving motor is stopped after the polymer injection. When, moreover, the nozzle is shut simultaneously with the stop of screw rotation, abnormally high pressure is induced in the vicinity of the tip of the closed nozzle. The high pressure thus induced will bring about leakage of the polymer from the nozzle tip or, in some case, will invite machine breakage.

OBJECTS

It is, therefore, an object of the present invention to provide an improved plastics-processing extruder having a combined performance of extrusion and injection.

Another object of the present invention is to provide an improved plastics-processing extruder of the above type, in which the afore-mentioned drawbacks are eliminated.

Still another object is to provide an improved plastics-processing extruder of the above type, in which a molten plastic material under high pressure can be discharged intermittently for the injection performance into a mold-cavity within a shortened period of time, and in which even with the nozzle tip being closed injection-molded products can be consecutively obtained without incuring the leakage of the plastics material and the machine breakage.

SUMMARY OF THE INVENTION

According to a major feature of the improved plastics-processing extruder of the present invention, there is provided a boosting means, which is formed in a supply portion of a cylinder for allowing the plastic material to fully occupy in the supply portion the clearance between a screw and the cylinder, so as to boost the discharge pressure of the plastic material to a predetermined level suitable for the injection performance.

According to another major feature of the present plastics-processing extruder, there is provided a backflow means, which is formed in such thread portions of the screw, as correspond to a melting portion of the cylinder, for allowing the plastic material to flow backwardly therethrough so as to prevent an abnormally high level of the discharge pressure from being built up in the machine.

BRIEF DESCRIPTION OF THE DRAWINGS

Other objects and advantages of the present invention will be apparent from the following description taken in conjunction with the accompanying drawings, in which.

DESCRIPTION OF THE PREFERRED EMBODIMENTS

Figure 1:
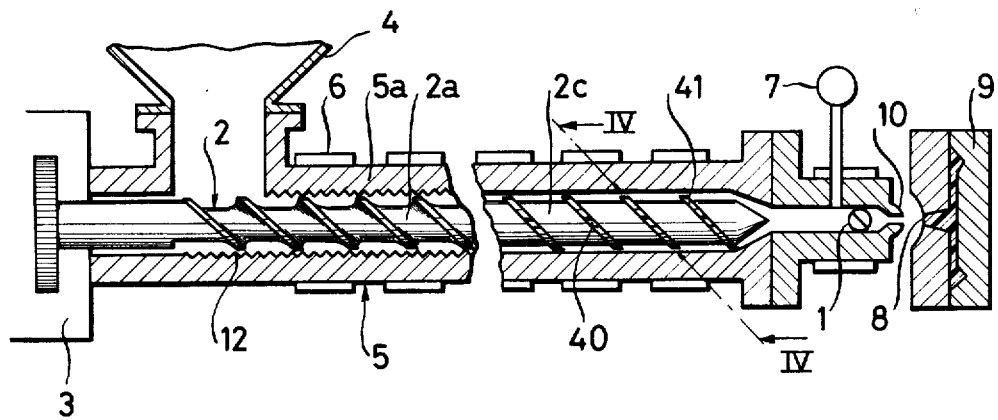
FIG. 1 is a longitudinal section showing an essential portion of a plastics-processing extruder according to the present invention.

The general construction of the plastics-processing extruder according to the present invention will be described with reference to FIG. 1.

When a valve 1 disposed in the downstream end is closed for the injection performance, a screw 2 is rotated by a prime mover 3. Then, the plastic material is thrown into a hopper 4, and is conveyed in a cylinder 5 in the forward direction to the valve 1, being subjected to heating, compression and mixing. The heating is performed by a heater 6 which is mounted on the cylinder 5.

At the downstream end of the cylinder 5 is provided a pressure gauge 7, which is operative to detect the pressure level of the material prevailing in the cylinder 5. When the pressure level detected by the pressure gauge 7 exceeds a predetermined value, a sprue bush 8 of a mold 9 is thrust into contact with a nozzle 10, and the valve 1 is opened to fill the plastic material into the cavity of the mold 9. After that, the mold 9 is detached from the nozzle 10, and the valve 1 is closed and the rotation of the screw 2 is stopped both concurrently with the detachment. A series of these operations may desirably be carried out in an electrically automatic manner.

After this series, another mold 9 is attached to the valve 1 and the screw 2 is concurrently rotated. In these ways, the operations are cyclically repeated.

The above injecting operations of the present extruder can be accomplished by the following construction arrangements.

In the extruder, there is adopted a boosting means, which is formed in a supply portion of the cylinder 5 for allowing the plastic material to occupy in such supply portion fully the clearance between the cylinder 5 and the screw 2, as longitudinally corresponds to the supply portion, so as to boost the discharge pressure of the plastic material to a predetermined level which is high enough for the injecting operations.

Generally speaking, the screw 2, which is rotatably inserted in the cylinder 5 for conveying the plastic material through the clearance inbetween, is divided into three portions, that is, the supply, compression and melting portions, to which the portions of the clynder 5 correspond. Thus, the plastic material thrown into the hopper 4 is compressed and mixed by the rotation of the screw 2 and is melted by the heater 6, until it is discharged from the nozzle 10. If, in this instance, the inner wall of the cylinder 5 is highly smooth, the plastics material being worked will receive little resistance from the cylinder wall and rotate freely with upon the outer surface of the screw 2 inner wall but heavily to the outer surface of the screw 2, thus. As a result, it is impossible to obtain a high pressure at the tip of the nozzle 10.

In the present extruder, as shown in FIG. 1, the cylinder supply portion 5a, which corresponds to the screw supply portion 2a, is formed with a rough surface 12 into which the plastic material intrudes to create rotational resistance so that the material may fully occupy the clearance inbetween so as to boost the discharge pressure of the material to a predetermined level high enough for the injecting operations.

As for the boosting means, alternatives are conceivable, some of which will be described with reference to FIGS. 2 and 3. The embodiment of FIG. 2 employs a combination of a different-diameter cylinder 21 and a different-diameter screw 22. As shown in FIG. 3, on the other hand, another embodiment does not employ the screw of different diameter but has its supply portion 31a of the cylinder 31 formed with a plurality of threads 34 which are arranged in an opposite helical direction to that of the threads 33 of the screw 32.

Figure 2:
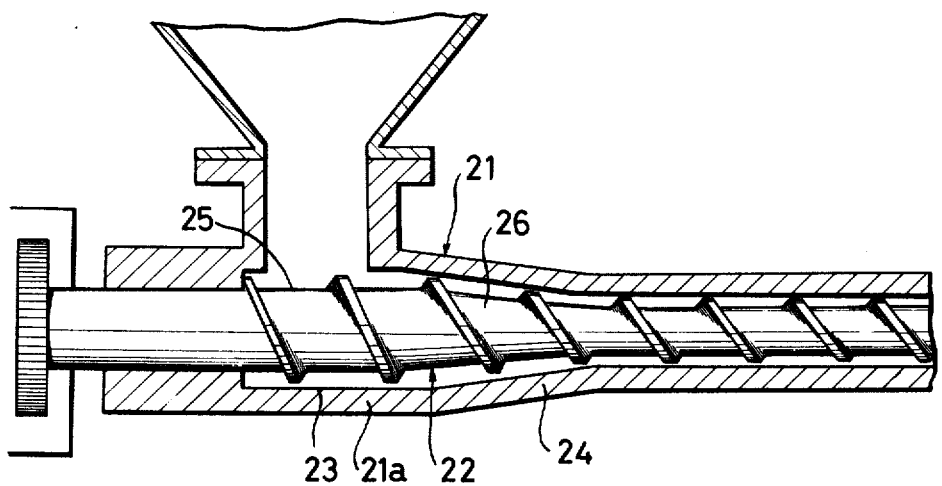
FIGS. 2 and 3 are similar to FIG. 1 but show other embodiments of the present invention.
Figure 3:
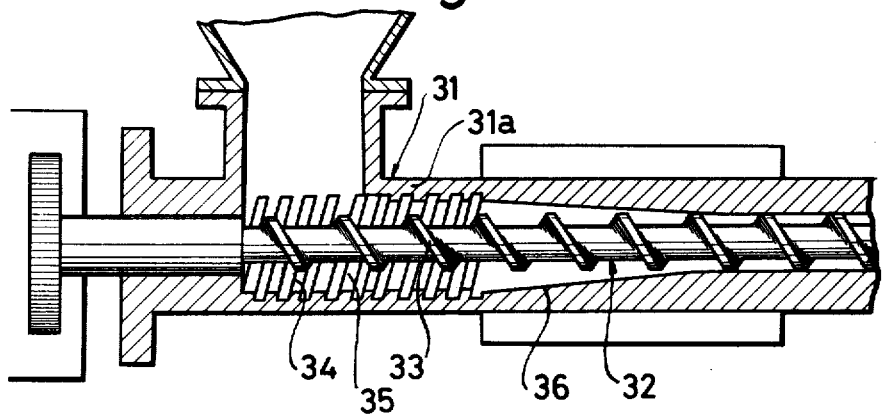

In FIG. 2, more specifically, the supply portion 21a of the cylinder 21 is composed of an enlarged-diameter portion 23 and a converging portion 24 merged from the portion 23 into the compression portion of the cylinder 21. In this cylinder 21 is rotatably inserted a screw 22 which is composed of an enlarged-diameter portion 25 and a tapered portion 26 positioned to radially face the cylinder converging portion 24. Thus, the plastic material fed into the clearance between the enlarged-diameter portions 23 and 25 will wet the inner walls of the two and will then be subjected to compression in the clearance between the converging portion 24 and the tapered portion 26. Under these conditions, the plastic material is cenveyed to the nozzle, where it attains its highest pressure level.

In another embodiment of FIG. 3, on the other hand, the supply portion 31a of the cylinder 31 is likewise composed of an enlarged-diameter portion 35 and a converging portion 36. In this cylinder 31, on the contrary, is rotatably inserted a screw 32 which has the same length and an uniform diameter. The enlarged-diameter portion 35 is formed at its inner periphery with a plurality of threads 34 which are arranged in an opposite helical direction to that of the threads 33 of the screw 32. The plastic material engages the helical grooves formed in the threads 34 of the enlarged-diameter portion 35, and then is highly compressed by the screw 32 at the converging portion 36. The plastic material thus conveyed attains its highest pressure level at the nozzle tip.

According to another major feature of the present invention, a back-flow means is formed in the melting portion of the screw for allowing the plastic material to flow backwardly therethrough so as to reduce the discharge pressure of the material, so that an abnormally high level of the discharge pressure may be prevented from being built up in the clearance.

Reverting to FIG. 1, when the first series of the injecting operations are completed with the mold 9 being removed from the sprue bush 8, the valve 1 is concurrently closed and the screw 2 is stopped. If it were not for the back-flow means, the plastic material would partially leak from the valve 1 due to the prevailing high pressure exerted on the valve 1.

With this in mind, therefore, a plurality of parallel grooves 40 are formed on the periphery of and longitudinally of the melting portion 2c of the screw 2 so as to allow the plastic material, which might otherwise be confined in the vicinity of the nozzle tip, to be relieved backwardly therethrough.

Figure 4:
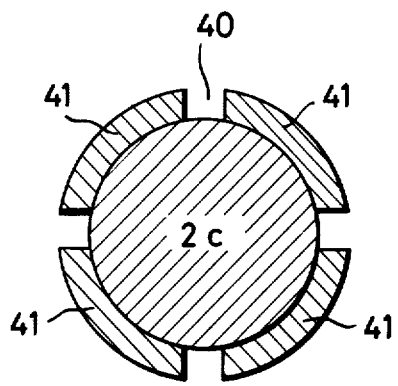
FIG. 4 is a enlarged cross-section taken along the line IV—IV of FIG. 1 for showing the melting portion of the screw.
Figure 5I:
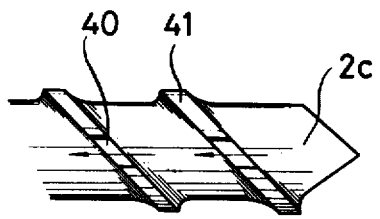
FIGS. 5(i) and (ii) are perspective views showing the construction arrangements of parallel grooves which are formed in the melting portion of the screw according to the present invention.
Figure 5:
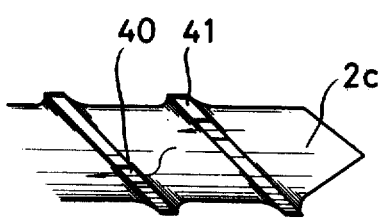

Turning now to FIG. 4, indicated at reference numerals 40 and 41 are the parallel grooves and threads of the screw 2, respectively. These grooves 40 are bounded by surfaces which are parallel to the longitudinal axis of the screw, and may be arranged along the same longitudinal lines, as shown in FIG. 5(i), or may alternatively be arranged to be angularly spaced from the longitudinally adjacent one, as shown in FIG. 5(ii). The number, depth and width of these grooves 40 may be varied in accordance with the property of the plastic material and with its stay period in the cylinder.

Figure 6:
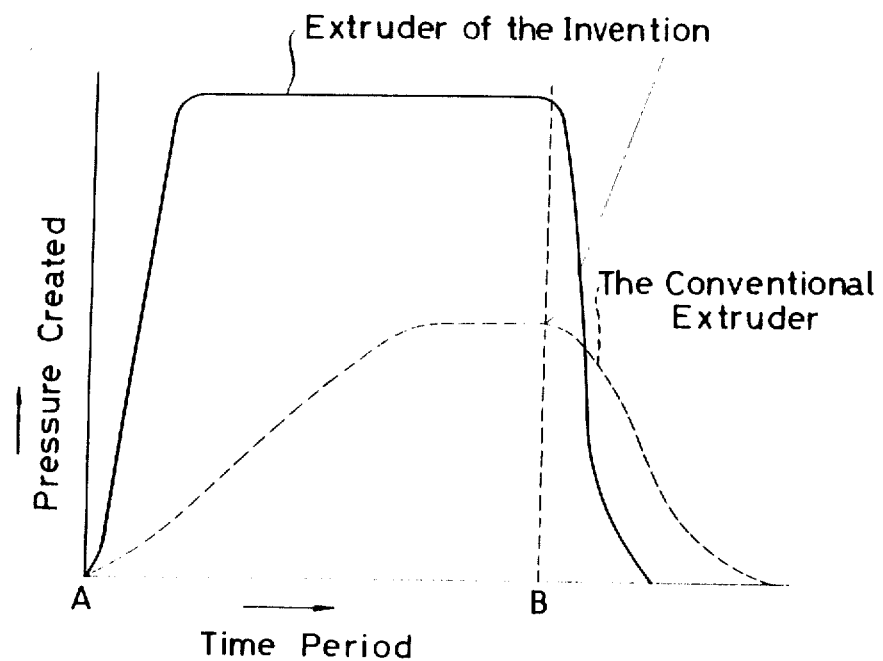
FIG. 6 is a graphical presentation showing the relationship between the pressure built up at the tip of the cylinder and the time duration during which the screw is rotated.

Reference will now be made to FIG. 6, in which the relationship between the pressure creation at the cylinder downstream end and the time duration from initiation of the screw rotation is graphically presented as for the present extruder equipped with the boosting means of the discharge pressure and with the back-flow means of the excessive plastic material, in comparison with that of the conventional extruder capable of performing the extrusion only. In this graph, the horizontal axis represents the screw rotation time period and the vertical axis the pressure created. In this instance, the solid line corresponds to the extruder according to the present invention, and the broken line corresponds to the conventional extruder.

In the conventional extruder, the pressure gradually increases with the duration of time from the point A, and the residual pressure is still maintained to continue the undesired leakage of the plastic material even after the screw rotation is stopped, as shown at the point B. If, accordingly, the nozzle is completely shut off, the residual pressure will abruptly increase, as shown at the dotted curve, to such an excessively high level as to invite the machine breakage. On the contrary, the pressure curve with the present extruder shows an abrupt and higher pressure generation concurrently with such an initiation of the screw rotation as indicated at the point A, and the same high pressure level is maintained during the screw rotation. This high pressure level rapidly decreases concurrently with the stopping of the screw rotation, as shown at the point B.

Examples of the present extruder will now be enumerated in the following:

EXAMPLE I a. Screw
Outer Diameter (D) : 65 mm
Length (L) : L/D = 22
  Supply Portion : 13D, Compression Portion: 2D, and Melting Portion : 7D
Back-Flow Grooves:
  Type of FIG. 5(i), Depth:2.2 mm, and Width : 2.5 mm
  Four Lines (arranged to be equi-angularly spaced from each other over the whole surface of the melting portion)
Compression Ratio : 1 : 4
b. Cylinder
The whole area of the supply portion was formed with a rough surface which had twill lines with a pitch of 0.6 mm and a depth of 0.3 mm.
c. Operations
  With use of the above extruder, a polyethylene resin of high density (M1-1) was molded at the screw rotation speed of 80 RPM, under the discharge pressure of 300 Kg/cm$^2$, for the injection time duration of 60 sec., at the material temperature of 190 degrees. The resultant product was a thick plate having a thickness of 25 mm, a length of 200 mm, a width of 200 mm, and a weight of 1 Kg. The product was free from any mold cavity.

EXAMPLE II a. Screw
Outer Diameter (D) : 65 mm
Length (L) : L/D = 22
  Supply Portion : 7D, Compression Portion : 9D, and Melting Portion : 6D
Back-Flow Grooves :
  Type of FIG. 5(ii), Depth : 2.2 mm, and Wigth : 1.7 mm
  Six Lines (arranged to be equi-angularly spaced from each other over the whole surface of the melting portion)
Compression Ration : 1 : 2.7
b. Cylinder The whole area of the supply portion was formed with a rough surface which had twill lines with a pitch of 1.5 mm and a depth of 0.6 mm.
c. Operations With use of the above extruder, a polystylene of anti-shock type was molded at the screw rotation speed of 60 PRM, under the discharge pressure of 400 Kg/cm$^2$, for the injection time duration of 20 sec., at the material temperature of 180 degrees. The resultant product was a salad bowl having an outside diameter of 150 mm and a weight of 300 g. The foaming ratio of the product was 120 % and the resulting pores were found remarkably fine and uniform. Even after several hundreds of the molding cycles weight and shape of the products remained uniform and no leakage of material at the nozzle occurred.

As has been detailed hereinbefore, the present invention is featured in that the boosting means is formed in the supply portion for allowing the plastic material to fully occupy the clearance at the supply portion to thereby boost the discharge pressure to a predetermined high level, and in that a plurality of back-flow grooves are formed in the melting portion of the screw for allowing the plastic material to flow backwardly therethrough to thereby prevent an abnormally high discharge pressure, which might otherwise be exerted on the valve outlet after stopping of the screw rotation and which might otherwise lead to leakage of the material and/or breakage of the mechanism, from being built up. Thus, it should be appreciated that the present extruder can perform the injection in addition to its intrinsic extrusion.

The present invention should also be appreciated in that by changing the capacity of the clearance as well as the screw rotation speed the amount of injection can be accordingly changed within a wide range so that a variety of moldings can be obtained with a wide range of weight, for instance, 0.1 to 1.2 Kg. It should further be appreciated that, since the present extruder has a high ability of plasticity, it can produce a cell-structure molding with fine and uniform pores.

Figure 7:
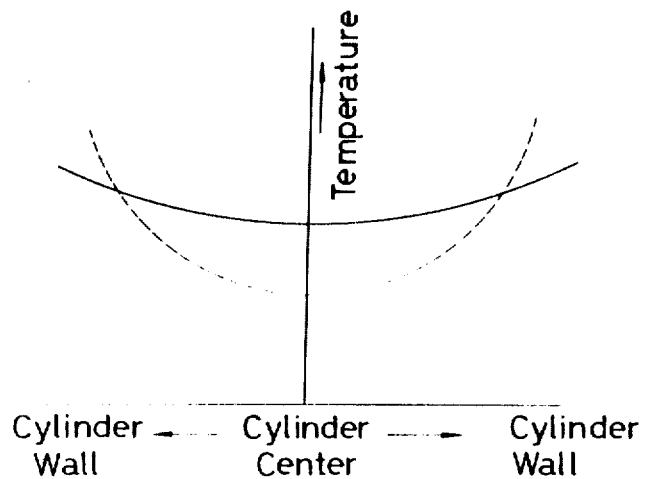
FIG. 7 is a graphical presentation showing a radial temperature distribution of the plastics material at the cylinder tip.

It should further be appreciated that the present extruder can uniformly melt the plastic material with respect to the radial temperature distribution. As shown in FIG. 7, more specifically, the temperature distribution has a more shallow bottom at the center (Reference should be made to the solid curve). This means that the molten material in the vicinity of the cylinder downstream end has less temperature difference between its central portion in the vicinity of the screw and its radially outermost portion in the vicinity of the cylinder wall. To the contrary, the conventional extruder has a steeper gradient in the radial temperature distribution (Reference should be made to the broken curve). In view of this fact, the present extruder can melt the plastic material at a lower temperature and in a more uniform manner, thus reducing the required filling pressure into the mold. This implies that the present extruder can employ more advantageously an aluminium mold, which can be appreciated not only in its price but also in its high heat conductivity. From the latter advantage, more specifically, the molding can be cooled within a shortened period of time with use of the aluminum mold.

What is claimed is:

1. A plastics extrusion-injection molding machine having:

a cylinder including three portions for supply, compression and melting through which plastic material is conveyed in that order, a screw having a longitudinal axis rotatably inserted in said cylinder for conveying plastic material through the clearance between said cylinder and said screw, a nozzle attached to the downstream end of said cylinder for extruding and injecting the plastic material there through into a mold which is removably attached thereto, and a valve mounted in said nozzle for controlling the opening of the same, the improvement which comprises:

boosting means formed in the supply portion of said cylinder for allowing the plastic material to fully occupy such portion of said clearance as corresponds to said supply portion so as to boost the pressure upon the plastic material within the cylinder, back-flow means in the melting portion of said cylinder for allowing the plastic material to flow backwardly therethrough to mitigate abnormally high pressure from being built up in said melting portion, said back-flow means comprising a plurality of grooves that extend through the threads of said screw, and are bounded by surfaces which are parallel to the longitudinal axis of said screw.

2. A plastics molding machine of claim 1 wherein said boosting means includes a rough surface on inside walls of said cylinder in the supply portion thereof.

3. The plastics molding machine of claim 2 wherein said grooves are equi-angularly spaced from each other and have a width of 1.7 to 2.5 mm.

4. The plastics molding machine of the claim 1 wherein a plurality of the total number of said grooves are positioned so that they fall along a common longitudinal axis.

5. The plastics molding machine of claim 1 wherein said grooves are arranged so that longitudinally adjacent ones are angularly spaced from each other so they do not fall along a common longitudinal axis.

* * * * *